United States Patent Office 3,740,332
Patented June 19, 1973

3,740,332
PROCESS FOR TREATING SEPTIC BIOLOGICAL WASTES IN ARCTIC CLIMATES
Edward L. Cole, Fishkill, and Howard V. Hess, Glenham, N.Y., assignors to Texaco Inc., New York, N.Y.
Filed Jan. 21, 1971, Ser. No. 108,493
The portion of the term of the patent subsequent to Apr. 21, 1987, has been disclaimed
Int. Cl. C02b 1/02
U.S. Cl. 210—63    4 Claims

ABSTRACT OF THE DISCLOSURE

Septic biological wastes, including both commercial and industrial wastes produced in Arctic climates, are rendered sterile and suitable for discharge by being passed to a primary settler where solids contained therein are separated from clear effluent. The solids are coked in the liquid phase and the resulting coke is separated from the liquid. The decoked liquid is mixed with the effluent from the primary settler and the resulting mixture is air oxidized.

BACKGROUND OF THE INVENTION

Figure 1:
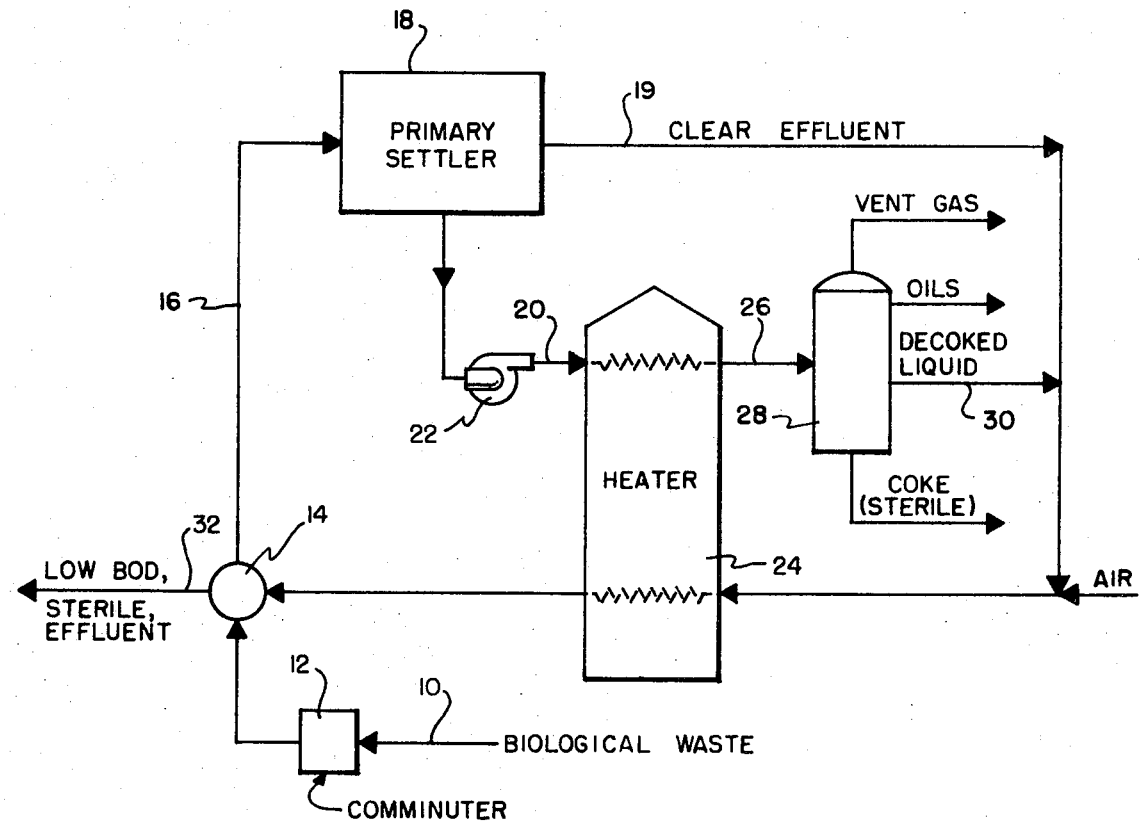

The present invention relates to the treatment of septic biological wastes. More particularly, this invention relates to a process for treating such wastes in Arctic type climates to obtain separate, innocuous, solid wastes and a sterile liquid stream.

With the discovery of petroleum and other minerals in the Arctic and Antarctic the human population of these regions is increasing. The steadily growing population portends an aggravation of the sewage disposal problem in these areas.

In temperate climates modern sewage plants depend on primary settling tanks or ponds whereby both the organic and inorganic particulates are removed as sludge. The raw sludge is generally filtered to give a filter cake that is buried as landfill or incinerated. The liquid from the primary settler and the fiiltrate from the filter drum pass to a secondary treating zone that makes use of an activated sludge for 90 percent reduction in organic matter in the waste stream. In this phase of the process the effluent from the primary settler, activated sludge and air are mixed and allowed to react for several hours. The activated sludge is biologically active and is largely composed of microorganisms endemic to the area but conditioned to thrive on the particular type of effluent being treated. Ultimately, the activated sludge is separated in a settling tank or pond and a portion of the separated activated sludge is recycled to treat fresh effluent from the primary setler. The other portion of the sludge is filtered and the solids buried or incinerated. The clear liquid from the activated sludge treatment is frequently chlorinated as a final stage in the treatment of the waste water prior to discharge into a river or other body of water.

The fate of the enteric pathogens arriving at the sewage treating plant is of great importance. Fortunately, the conventionally simple systems solve very satisfactorily the complex problems associated with the destruction of the pathogens. Basically, the most favorable environment for the enteric organisms is the gastro-intenstinal system of man and once removed from this habitat, not only is their physical environment altered but they are forced into competition with other micro-organisms that are normal to the conditions of the sewage system. In this competition the pathogens fare poorly compared to the more vigorous micro-organisms in the activated sludge. In addition, the dramatic change in the eco-system as reflected by changes in temperature, pH, nutrients, toxins, sunlight, etc., lead to the death of many of the sensitive pathogens.

The incineration of the sludge is obviously an effective means of destroying all life. Burial as land fill is also equally effective because of the fact that the soil contains vast numbers of micro-organisms, 100 million-50 billion organisms per gram. The natural flora of the soil are adapted to their environment and are an integral part of the mechanism of the decomposition of the organic matter in the soil, thus the pathogens (with some exceptions, e.g. anthrax spores) from humans do not have a high chance of survival in the soil.

By contrast with aforedescribed conditions, in areas of extreme cold, normal treating methods including burial of sludges are not effective because the cold prevents the desirable bacterial actions described above. Although extreme cold in itself is sufficient to exert a lethal effect on millions of individual cells it has been found that there is always a certain percent that remains viable. Thus sewage dumped in the Arctic will remain frozen for the major portion of the year. During summer days the sewage will thaw and contaminate the surrounding area with water containing the pathogens. Infection will spread primarily to man but in certain cases may infect animal life native to the region. Thus, the potential for contamination in this area of the world is great because the chains of events common to the temperate and tropics have broken down.

Throughout this specification and claims, the term Biochemical Oxygen Demand (BOD) is the amount of oxygen required to maintain aerobic conditions during decomposition and is generally reported as the oxygen utilized by biological action when a sample of the material is incubated for five days at 20° centigrade. The Chemical Oxygen Demand (COD) is ascertained by tests invloving the chemical digestion of a sample with an oxidizing agent such as potassium dichromate. The term "percent" means percent by weight and "p.s.i.g." means pounds per square inch gauge. The term "arctic" refers to those regions having a mean temperature between about $-50°$ C. and $5°$ C.

Figure 2:
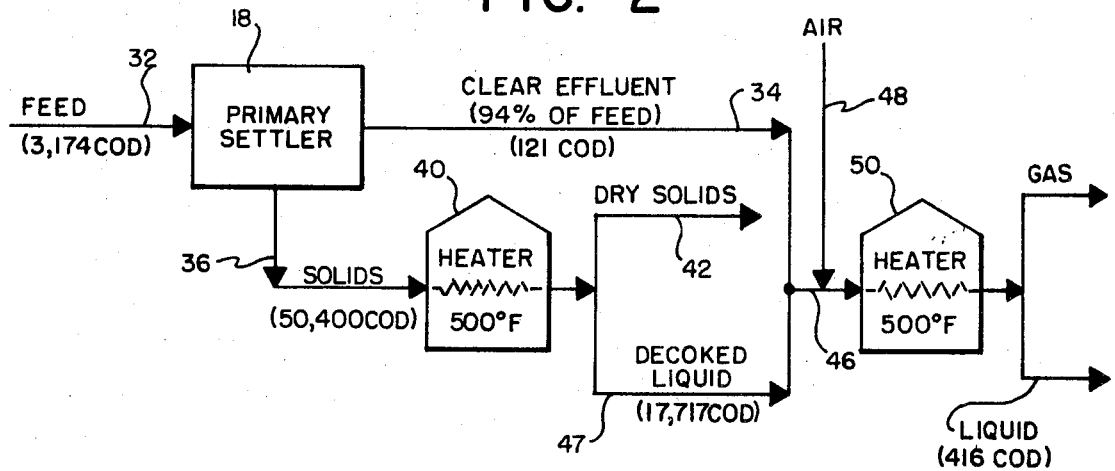

The objects and the advantages of the invention will become apparent upon reference to the following description thereof and to the appended drawing wherein:

FIG. 1 is a diagrammatic illustration of one flow scheme according to the invention and FIG. 2 is a simplified modification thereof.

In the embodiment of the invention depicted in FIG. 1, raw biological sewage from city or communal sewage systems is passed through line 10 into comminuter 12 and heat exchanged in heat exchanger 14 with hot effluent before passing through line 16 into a primary settling tank 18 maintained at between 40° and 180° F. but preferably at between 80° and 180° F. There solids separate out from a substantially clear effluent which passes out through line 19. The solids-containing phase are pumped out through line 20 by pump 22 and pass through the tubes of heater 24. The coking conditions are within the range: temperature from 400° to 700° F.; pressures from 300 to 3500 p.s.i.g. and a time of 0.5 to 120 minutes. The solids phase is coked in heater 24. The products of the coking reaction pass through line 26 into separator 28 for separation into coke, decoked liquid, an oil or grease phase if present and gas. The aforementioned coke and oil are disposed of as desired, for example, by burning for fuel value, but the decoked liquid is made to pass out through line 30 and mixed in line 19 with the clear effluent from the primary settler. The combined liquid stream together with air pass through a coil reactor in heater 24 which now serves as an oxidizer. The stream is held in the oxidizer tube for from 0.5 to 30 minutes. The effluent after exchanging with the incoming feed, as above mentioned, is discharged through line 32 as a sterile liquid low in COD and BOD. Frozen wastes that have accumulated should be thawed first in a heated drum before treatment by the present process.

In the embodiment of FIG. 2, the comminuted liquified feed passing through line 32 goes directly into primary settler 18. Alternatively, the primary settler may have heating means for melting the feed. A clear effluent is withdrawn from line 34 and the solids are passed through line 36 into tubular heater 40. The solids are removed through line 42 while the decoked liquid passes out through line 47 and is mixed with effluent from the primary settler in line 46. Air is introduced through line 48 and the stream is oxidized in heater 50 to give gas and liquid of low COD (BOD).

Specific examples of the artic sewage treatment according to the invention follow:

In the following Examples II–IV, the following stocks were used and tested as follows:

EXAMPLE I

| Sample | Clear effluent from primary settler, sewage plant | Sludge from primary settler, sewage plant |
|---|---|---|
| Sample No | 1 | 2 |
| COD/mg. $O_2$/L | 121 | 50,400 |
| pH | 7 | |

EXAMPLE II

Using thet charge stocks of Example I this example was carried out as shown in FIG. 2.

The yields and tests on the three product streams

| | Sterile | | |
|---|---|---|---|
| | Liquid | Solids | Gas |
| Yield, wt. percent basis charge | 98.4 | 0.06 | 1.2 |
| COD, mg. $O_2$/L | 416 | | |
| pH | 6.3 | | |
| Carbon, wt. percent | | 49.2 | |
| Ash, wt. percent | | 30.2 | |
| Mole, percent (air free): | | | |
| $CO_2$ | | | 97.1 |
| $H_2$, $C_1$-$C_4$, $H_2S$ | | | 2.9 |

The details from which the foregoing summary has been obtained are summarized below:

Procedure—In keeping with Example II 825 grams of sludge from Example I was placed in a 1980 ml. batch autoclave. The autoclave was flushed with nitrogen, sealed, and heated to 500° F. The autoclave was held at this temperature for two hours, cooled, and vented. 1640 ml. gas was recovered together with a liquid product from which the solids are filtered. No oil or grease was noted. Tests on the various products are as follows:

| Sample | Yellow liquid | Solids | Gas |
|---|---|---|---|
| Yield, wt. percent | 98.2 | 1.45 | 0.38 |
| Wt., grams | 779 | ¹16 | 3.1 |
| Sample No | 3 | 4 | 5 |
| COD, mg. $O_2$/L | 17,702 | | |
| pH | 5 | | |
| Carbon, wt. percent | | 49.2 | |
| Ash, wt. percent | | 30.2 | |
| Mole, percent: | | | |
| $C_1$ | | | 1.0 |
| $C_2$ | | | 0.4 |
| $C_3$ | | | 0.9 |
| $C_4$ | | | 0.5 |
| $CO_2$ | | | 97.1 |
| $H_2S$ | | | 0.1 |

¹ Wet (12 dry).

The products from primary settler were divided so that 94 percent was clear effluent (121 COD) and 6 percent sludge (50,400 COD), representing a feed having a COD of 3174. The sludge was coked as above and a portion of the yellow liquid was blended with the clear effluent in the ratio of production, 12 grams Sample 3 and 188 grams Sample 1 (Example I). The blend was placed in a glass lined autoclave, pressured with air to 100 p.s.i.g. and with rocking heated to 500° F. It was held at this temperature for one hour, cooled and vented. The liquid was filtered and had a COD of 416.

| Sample | Clear liquid | Gas |
|---|---|---|
| Yield, wt. percent | 98.8 | 1.2 |
| Sample No | 6 | 7 |
| COD, mg. $O_2$/L | 416 | |
| pH | 6.3 | |
| Mole, percent: | | |
| $H_2$ | | 0.2 |
| $CO_2$ | | 13.6 |
| Air, $N_2$ | | 86.2 |

EXAMPLE III

Figure 3:
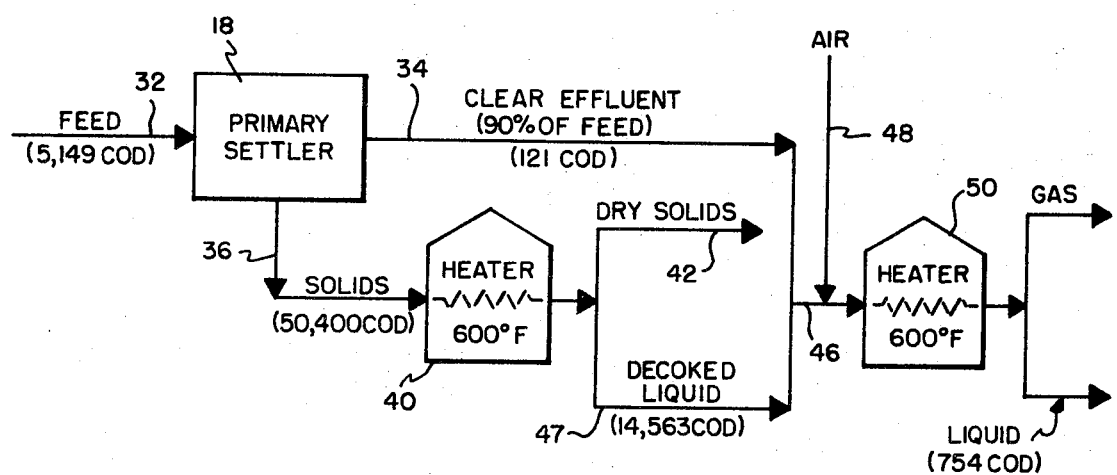

The yields and tests on the three product streams secured by the procedure as shown in FIG. 3 are summarized as follows:

| | Sterile | | |
|---|---|---|---|
| Sample | Liquid | Solids | Gas |
| Yield, wt. percent basis charge | 98.32 | 0.13 | 1.55 |
| COD, mg. $O_2$/L | 754 | | |
| pH | 4.9 | | |
| Carbon, wt. percent | | 45.5 | |
| Ash, wt. percent | | 23.8 | |
| Mole, percent (air free): | | | |
| $CO_2$ | | | 92.0 |
| $H_2$, $C_1$-$C_5$, $H_2S$ | | | 8.0 |

The details from which the foregoing summary have been obtained are summarized below:

Procedure 825 grams (Sample 2) from Example I (COD 50,400) were placed in 1980 ml. batch autoclave. The autoclave was flushed with nitrogen, sealed, and heated to 600° F. The autoclave was held at this temperature for one hour, cooled and vented. 2415 ml. of gas were recovered. The product was withdrawn and allowed to settle. A trace of oil and/or grease was noted on top but not sufficient to recover. The solids were filtered off and the COD of yellow liquid was found to be 14,563.

| Sample | Yellow liquid | Solids | Gas |
|---|---|---|---|
| Yield, wt. percent | ᵃ 98.2 | ᵇ 1.33 | 0.46 |
| Weight, grams | 768 | ᶜ 15 | |
| Sample No | 8 | 9 | 10 |
| COD, mg $O_2$/L | 14,563 | | |
| pH | 5.5 | | |
| Carbon, wt. percent | | 45.5 | |
| Ash, wt. percent | | 23.8 | |
| Mole, percent: | | | |
| $H_2$ | | | 3.6 |
| $C_2$-$C_4$ | | | 3.7 |
| $H_2S$ | | | 0.5 |
| $CO_2$ | | | 92.2 |

ᵃ By difference.
ᵇ Dry.
ᶜ Wet (11 dry).

The products from the primary settler were divided so that 90 percent was clear effluent (121 COD) and 10 percent sludge (50,400 COD), representing a feed having a COD of 5149. The sludge was coked as above and a portion of the yellow liquid was blended with the clear 180 grams Sample 2 (Example I). The blend was placed in an autoclave, pressurized with air to 100 p.s.i.g. and with rocking heated to 600° F. It was held at this temperature for one hour, cooled and vented. 9530 ml. of gas was recovered. The liquid was filtered.

| Sample | Clear liquid | Gas |
|---|---|---|
| Yield, wt. percent | 98.5 | 1.5 |
| Sample No | 11 | 12 |
| COD, mg. $O_2$/L | 754 | |
| pH | 4.9 | |
| Mole, percent: | | |
| $H_2$ | | 0.2 |
| $CO_2$ | | 16.3 |
| Air, $N_2$ | | 83.5 |

EXAMPLE IV

Figure 4:
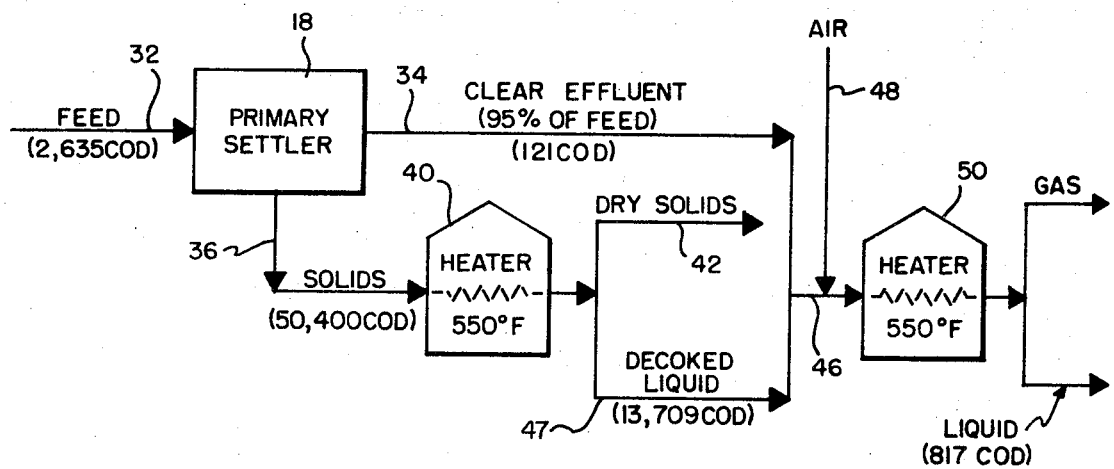

The yields and tests on the three other product streams secured by the procedure shown in FIG. 4 are summarized as follows:

| Sample | Sterile Liquid | Solids | Gas |
|---|---|---|---|
| Yield, wt. percent basis charge | 98.73 | 0.07 | 1.2 |
| COD, mg. $O_2/L$ | 817 | | |
| pH | 2.6 | | |
| Carbon, wt. percent | | 40.1 | |
| Ash, wt. percent | | 43.1 | |
| Mole, percent (air free): | | | |
| $CO_2$ | | | 91 |
| $H_2$, $C_1$-$C_5$, $H_2S$ | | | 9 |

The details from which the foregoing summary has been obtained are given as follows:

Procedure 950 grams of Sample 2 from Example I were placed in a 1980 ml. batch autoclave. The autoclave was flushed with nitrogen, sealed and heated to 550° F. The autoclave was held at this temperature for one hour, cooled and vented. 1910 ml. of gas were recovered. The product was withdrawn and allowed to settle. No grease or oil layer was observed. The solids were filtered off.

| Sample | Yellow liquid | Solids | Gas |
|---|---|---|---|
| Yield, wt. percent | [1] 98.2 | [2] 1.47 | 0.32 |
| Weight, grams | 849 | [3] 33 | 3.08 |
| Sample No | 13 | 14 | 15 |
| COD, mg. $O_2/L$ | 13,709 | | |
| pH | 4.6 | | |
| Carbon, wt. percent | | 40.1 | |
| Ash, wt. percent | | 43.1 | |
| Mole, percent: | | | |
| $H_2$ | | | 3.9 |
| $C_2$-$C_4$ | | | 5.0 |
| $H_2S$ | | | 0.6 |
| $CO_2$ | | | 90.5 |

[1] By difference.
[2] Dry.
[3] Wet (14 dry).

The products from the primary settler were divided so that 95 perecnt was clear effluent (121 COD) and 5 percent sludge (50,400 COD) representing a feed having a COD of 2,635. The sludge was coked as above and a portion of the yellow liquid was blended with the clear effluent in the ratio of production, i.e. 10 grams of Sample 13 and 190 grams of Sample 1 (Example I). The blend was placed in an autoclave, pressured with air to 100 p.s.i.g. and with rocking heated to 550° F. It was held at this temperature for 1½ hours, cooled and 9780 ml. of gas were recovered. The liquid was filtered.

| Sample | Clear liquid | Gas |
|---|---|---|
| Yield, wt. percent | 98.8 | 1.2 |
| Sample No | 16 | 17 |
| COD, mg. $O_2/L$ | 817 | |
| pH | 2.6 | |
| Mole, percent: | | |
| $CO_2$ | | 12.8 |
| Air, $N_2$ | | 87.2 |

The present process differs from commonly assigned U.S. Pat. No. 3,507,788 in that the former treats separately both the sludge and clear effluent from the primary settler at an elevated temperature to give (a) a sterile solid and (b) a sterile clear effluent whereas under the above-mentioned patent, only the sludge is treated at an elevated temperature. Further, U.S. Pat. 3,570,788 taught that the sludge should be coked under autogeneous pressure at elevated temperatures following by separation of the solids from the filtrate. The filtrate was then combined with clear effluent from the primary settler and was fed to an activated sludge treating zone. Thus there was not heat treatment of the clear effluent from the primary settler. The present process represents a novel improvement for Arctic use since activated sludge units would be difficult to operate in Arctic climates and even with the use of activated sludge there is danger of dischange of pathogens.

It will be understood by those skilled in the art that the present process provides a means of (1) producing a clear effluent of low COD (BOD) which is sterile enough to be freely discharged in the Arctic and (2) a sterile coke (solids) which may be burned or simply stored for ultimate removal from the Arctic. U.S. Pat. No. 3,507,788 does not do this nor does the prior art Zimpro or Porteous processes or more conventional sewage treating methods.

We claim:
1. In combination in a process for treating septic biological wastes to obtain a sterile, clear effluent of relatively low Chemical Oxygen Demand and sterile solids, the steps of passing the wastes to a primary settling zone; maintaining the temperature in said zone at between about 40° and 180° F. to separate solids from clear effluent; coking said solids in the liquid phase in a coking zone at a temperature of about 400° to 700° F. under a pressure of about 300 to 3500 p.s.i.g. for a period of time ranging from about 0.5 minutes to 2 hours and separating the coke so formed from clear liquid; mixing said clear liquid with said clear effluent and air oxidizing the resulting liquid stream at a temperature of about 400 to about 700° F. under a pressure of about 300 to about 3500 p.s.i.g. for a period of time of about 0.5 minutes ot 30 minutes to produce gas and a sterile liquid effluent having a reduced Chemical Oxygen Demand as compared with said biological wastes said sewage is heated by heat exchange with said sterile effluent resulting from said air oxidation step before passing to said settling zone.

2. The process of claim 1, wherein the temperature in said primary settler is maintained at between about 80 and 180° F.

3. The process of claim 1 for rendering sterile frozen septic biological wastes produced in Arctic and Antarctic regions.

4. The process according to claim 3, including the preliminary step of liquefying said frozen wastes.

References Cited

UNITED STATES PATENTS

| | | | |
|---|---|---|---|
| 1,929,179 | 10/1933 | Piatt | 210—187 X |
| 2,190,598 | 2/1940 | Fischer | 210—187 X |
| 3,591,449 | 7/1971 | Hess et al. | 210—63 |
| 3,507,788 | 4/1970 | Cole te al. | 210—71 X |

SAMIH N. ZAHARNA, Primary Examiner

U.S. Cl. X.R.

210—71